United States Patent Office 3,342,522
Patented Sept. 19, 1967

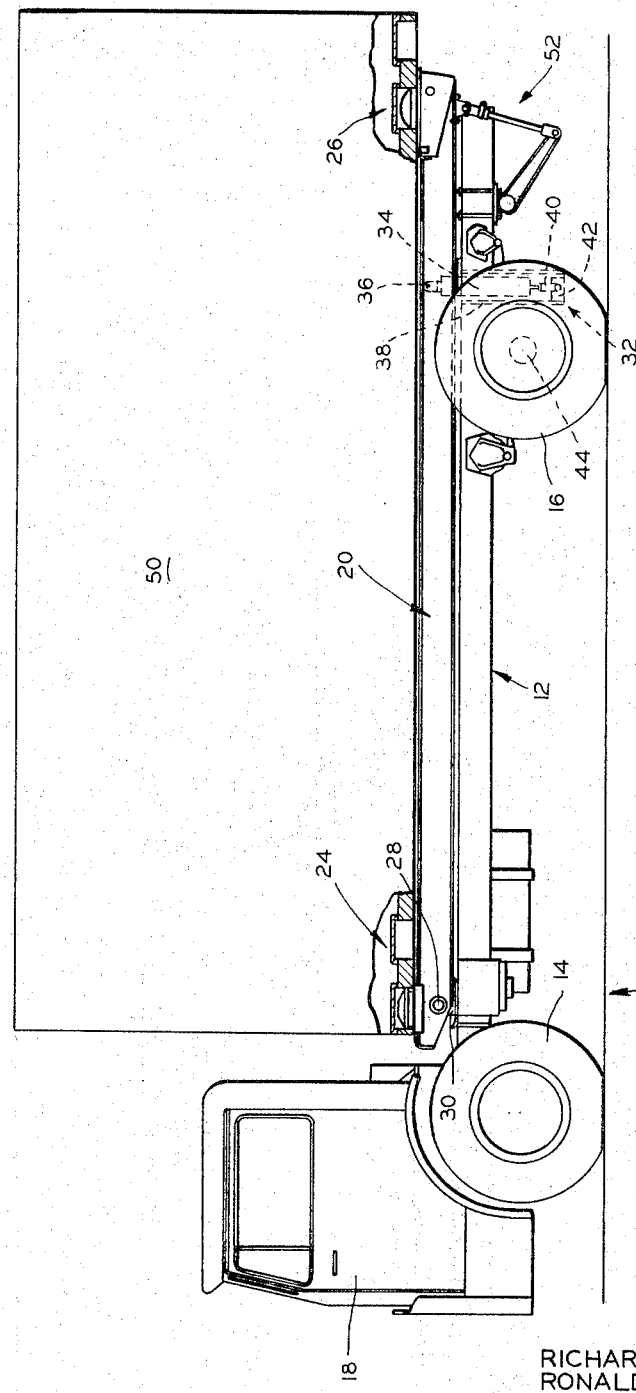

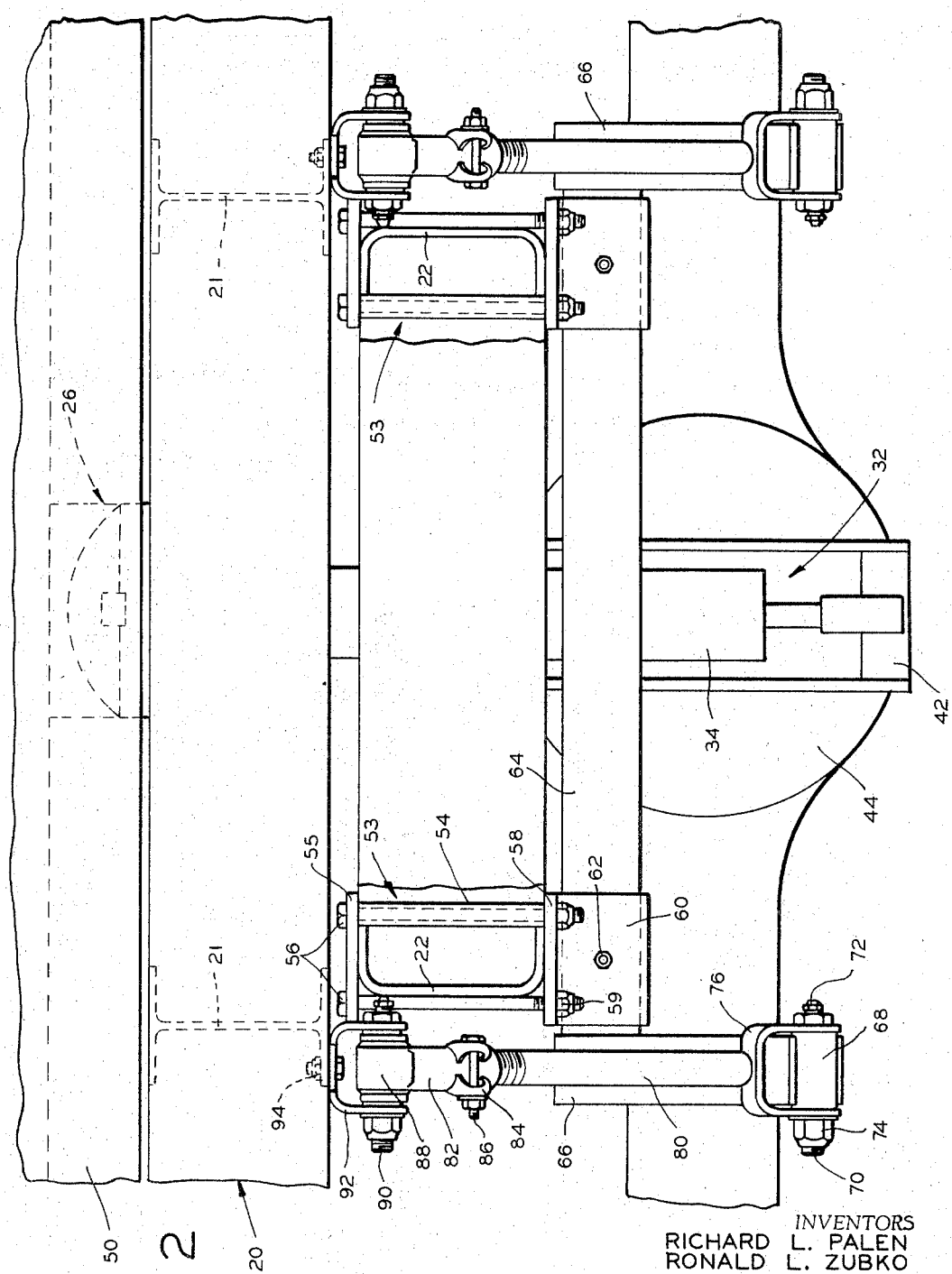

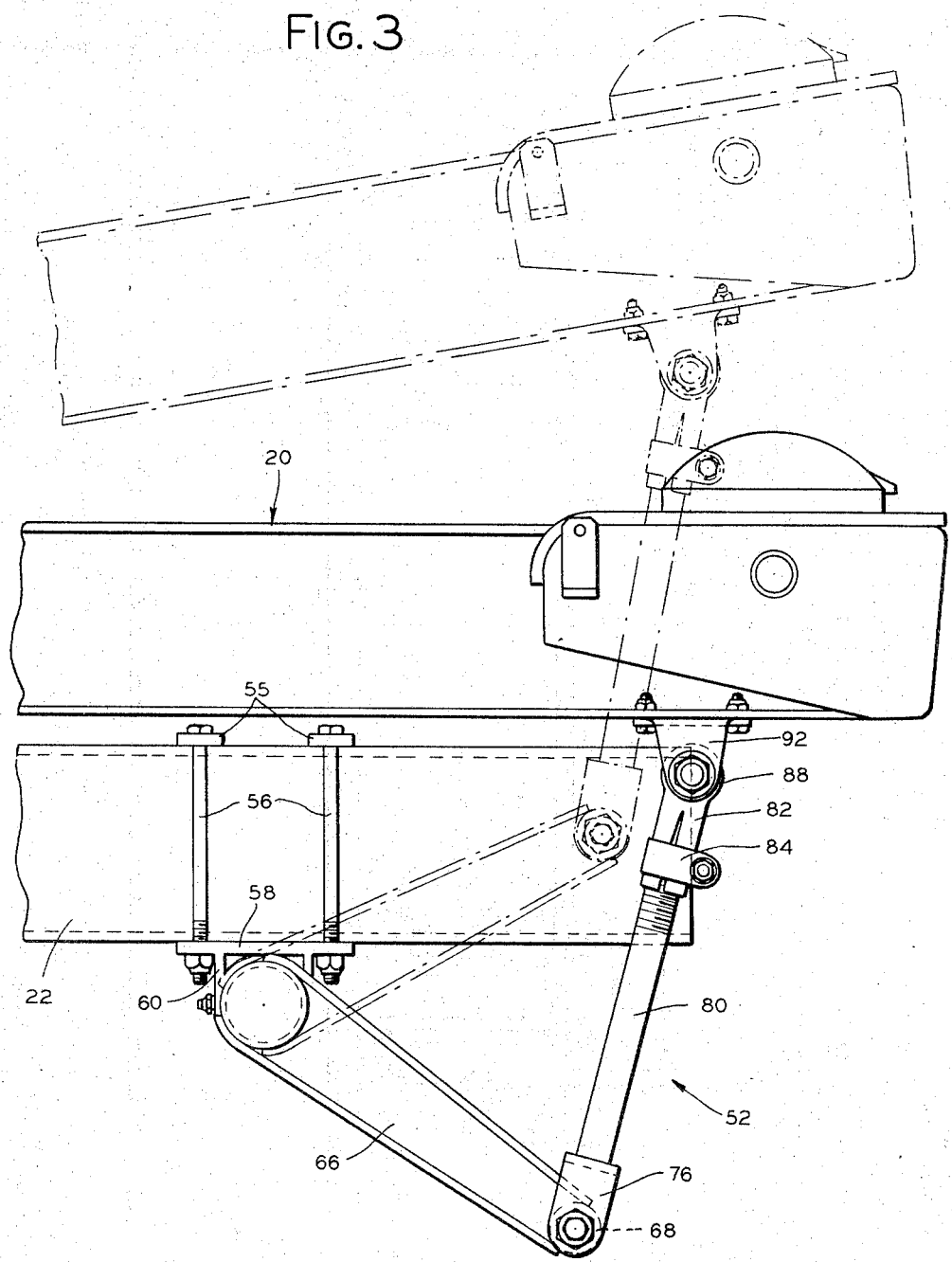

3,342,522
CONTAINER SUPPORT APPARATUS
FOR TRUCK FRAME
Richard L. Palen, New Buffalo, Mich., and Ronald L. Zubko, Michigan City, Ind., assignors to Clark Equipment Company, a corporation of Michigan
Filed Dec. 29, 1964, Ser. No. 421,982
3 Claims. (Cl. 296—35)

The present invention relates to improvements in stabilizer associated with truck frames, and more particularly to stabilizer mechanism which may be used with the apparatus for handling freight containers which is disclosed in copending application Serial No. 281,582, filed May 20, 1963, in the name of Johnny T. Watters, now Patent No. 3,188,042, dated July 8, 1965, which is assigned to the same assignee as the present invention.

In the freight art it is known that many advantages are obtainable in systems in which portable containers are used, for example, for packing, transporting, and storing goods. These containers may be of a wide variety of designs compatible with the goods to be handled, and are designed so that they may be readily mounted on or removed from a supporting structure, such as a transporting vehicle, loading docks, or other storage facilities. The above-mentioned patent discloses one form of an apparatus for conveniently transferring a freight container to or from a highway truck chassis, including actuating means operably connected between a truck chassis and a load supporting frame for pivoting the latter relative to the truck chassis.

It has been found in utilizing the invention of the said patent that unequal distribution of a load carried by the container, which frequently occurs in practice, imposes upon the load suporting frame, particularly when it is elevated above the truck chassis, forces which tend to be concentrated toward one side or the other of the supporting frame thereby tending to twist the supporting frame, freight container and other parts associated therewith about a longitudinal axis resulting in undue stresses and strains on the structure and rendering it difficult to transfer freight containers to or from the load supporting frame in accordance with the teaching of the said patent.

It is a primary object of the present invention to provide improved structure associated with certain types of truck apparatus for minimizing the effect of unequally distributed loads carried thereby.

Another object of the invention is to provide freight carrier means having an elevatable load carrying frame wherein load compensating structure is connected between opposite sides of the truck chassis and load supporting frame for tending to effectively equalize the load carried on each side of the frame irrespective of the manner in which a load is distributed on the load carrying frame.

The above and other objects and advantages of the invention will appear from the following detailed description when taken in conjunction with the accompanying drawings, wherein:

FIGURE 1 is a side elevational view of a container transfer truck incorporating apparatus according to the invention and a freight conainer supported thereby, the freight container being broken away to show certain apparatus associated therewith;

FIGURE 2 is an enlarged rear elevational view of a a portion of the transfer truck shown in FIG. 1; and FIGURE 3 is a side elevational view of a portion of the mechanism shown in FIG. 2.

Referring now to the drawings in detail, the present invention is shown incorporated in a truck 10 of a type comomnly used for local or short-haul delivery purposes. Truck 10 is a type referred to in the art as a transfer truck; it comprises a conventional chassis 12 mounted on forward and rearward road engaging wheels 14 and 16, respectively, a cab 18 for a driver, and the usual engine and control means, not shown, arranged in any well known manner for driving and steering the truck. A load supporting structure or frame is indicated at 20 defined by a pair of spaced apart longitudinally extending parallel frame members 21—21 which are braced by a plurality of longitudinally spaced and transversely extending frame members, not shown. A sliding dome assembly 24 is mounted for sliding movement longitudinally relative to the supporting frame 20 between the forward and rearward ends of the latter. A rotatable dome assembly 26 is mounted for rotation on an axis extending transversely of the rearward end of the supporting frame 20. Load supporting frame 20 is mounted for pivotal movement about an axis extending transversely of the forward end of the truck chassis 12 by means of pivot shafts 28—28, one of which is shown, carried by the longitudinal members of frame 20 and rotatably mounted in bearings 30 carried by the chassis 12. A hydraulic piston and cylinder assembly 32 is arranged centrally between the sides of chassis 12 and is connected to the load supporting frame 20 and to the chassis. It comprises a cylinder 34 pivotally mounted at 36 in framing which extends transversely of the supporting frame 20 and a piston rod 40 which at its outer end has pivotal connection with suitable frame and bracket means 42 adjacent the rear axle assembly 44 of the chassis 12. The piston and cylinder assembly 32 may be energized by hydraulic fluid under pressure to effect upward movement of the cylinder 34 so as to pivot the load supporting structure or frame 20 about the axis defined by the shafts 28—28 to thereby raise the rearward end of frame 20 above chassis 12, as shown in FIG. 3.

The structure described thus far, plus additional structure associated therewith, may be used transporting a freight container 50 and for transferring the container carried by the frame 20 and secured thereto by dome assemblies 24 and 26, to a semi-trailer, loading dock, or other storage facility, all as disclosed in detail in the above-mentioned patent.

The present invention combines with the above structure apparatus for effecting a re-distribution on the frame 20 of a load carried by the container 50, as described previously herein. It comprises a sway or torsion bar linkage 52 extending transversely of the truck and operatively connected between relatively fixed chassis 12 and movable frame 20. A torsion bar mounting assembly 53 includes a pair of longitudinally spaced plates 55 located on the top of each frame member 22 respectively, a pair of downwardly extending threaded bolts 56 depending from each plate 55 and connected by nuts 59 beneath each frame member 22 to a bracket member 58 which holds the bracket assembly 53 in fixed position relative to the frame members 22, each said bracket 58 having formed integrally therewith a U-shaped support member 60 having a grease fitting 62. A hollow torsion bar or torque transmitting member 64 extends transversely of the truck and is mounted for pivotal movement in U-shaped portions 60 of brackets 58. Rigidly secured, as by welding, to opposite ends of torsion bar 64 outwardly of brackets 58 is a pair of rearwardly extending arms 66 which at each opposite end is rigidly secured to a bearing sleeve 68 in which is mounted a pair of threaded pivot pins 70 having grease fitings 72 and held in position by nuts 74. A yoke 76 is mounted on each pin 70 for pivotal movement relative to the adjacent arm 66, and an upwardly extending link member 80 is secured rigidly to each yoke 76 which is threaded at its opposite end and received in a split hollow tube 82 having a bracket 84 tightly secured thereon by a bolt 86. The upper end of each split tubular member 82 forms a bearing portion 88 which receives a pivot bolt 90 supported by a yoke 92 which is bolted at 94 to a flange portion of one of the longitudinally extending structural members of frame 20.

In operation, actuating assembly 32 is energized to pivot upwardly load supporting frame 20 on shafts 28 from the solid line position illustrated in FIG. 3 to be broken line position shown. If a load carried by container 50 is equally distributed relative to be longitudinal portions of frame 20 on opposite sides of a longitudinal axis thereof, elevation of frame 20 by cylinder assembly 32 occurs without effecting a torsional load on torsion tube 64. That is, the portion of the linkage assemblies 52 on opposite sides of the truck are equally loaded as they lift with the container and frame 20 on the FIG. 3 position, so that torsion tube 64 functions merely as a pivot shaft supported by bracket portions 58 to provide linkage motion through arms 66 to links 80 as each said arm and link pivots about pivot pin 70 during elevation of the container as shown in FIG. 3. If, however, container 50 carries a load which is concentrated in the right-hand portion of the container, for example, as viewed in FIG. 2, it will be apparent that the container and the entire truck structure, including chassis 12 and frame 20, will tend to be twisted in a clockwise direction about a longitudinal axis thereby tending to deflect downwardly right-hand linkage 80, 66, relative to the left-hand linkage, resulting in the transmitting of torque by torsion bar 64 to left-hand linkage 80, 66 which imposes a downward force on the left-hand side of the frame 20 tending to equalize the effective load on the two sides of the frame to maintain approximately unstressed by twisting forces chassis 12, frame 20 and container 50 irrespective of the degree of elevation of frame 20 relative to the chassis.

Thus, it is seen that irrespective of variations in load distribution, the torque tube and linkage construction at the rear end of the load support frame effectively redistributes the load on all component structure by twisting the load support frame in a direction which is opposed to the direction in which the frame tends to twist as a result of an unequally distributed load carried by container 50. The structure of our invention therefore always tends to maintain the chassis 12, frame 20 and container 50 in the same condition as exists when a load carried by the container is equally distributed on opposite sides of the longitudinal axis of the container.

It has been found that the present invention is extremely important to the proper functioning of a system for handling freight containers of the type disclosed in the aforementioned patent, particularly in view of the inherent susceptibility of load supporting frame 20 to such twisting forces when in an elevated position since except for the torsion bar linkages 52 the frame is connected to chassis 12 merely by pivot members 28 and single actuator cylinder 32. Maintenance in an untorqued condition of the supporting frame 20 and container 50 at any elevated position of the frame and container is also essential for maintaining the locking mechanisms 24 and 26 in proper location to smoothly engage and disengage corresponding locking mechanism on semi-trailers, loading docks and the like, with which the transfer truck 10 is designed to operate, all as described in the above-identified patent.

Although we have described and illustrated a preferred embodiment of our invention, it will be understood by those skilled in the art that modifications may be made in the structure, form and relative arrangement of parts without departing from the spirit and scope of the invention. Accordingly, it should be understood that we intend to cover by the appended claims all such modifications which fall within the scope of our invention.

We claim:

1. In a mobile material handling apparatus having an operator's station and a wheeled chassis, a load supporting frame mounted on the chassis, actuator means connected between the chassis and frame for selectively elevating said frame relative to the chassis, and a load equalizer means interconnecting the chassis and frame tending to equalize the loads carried by opposite sides of the frame comprising a torsion bar extending transversely of the chassis and supported thereby for pivotal movement relative thereto, linkage means rigidly connected to opposite ends of the torsion bar and pivotally connected to the opposite side portions of the frame and effective at any elevated position of said frame to transmit forces on one side of the frame to the opposite side thereof through said torsion bar responsive to the difference in load carried by the opposite sides of the frame.

2. In a mobile material handling apparatus having an operator's station and a wheeled chassis, a load supporting frame pivotally mounted forwardly of the chassis, actuator means connected between the chassis and frame rearwardly thereof for pivoting said frame upwardly relative to the chassis about the forward pivotal connection thereof, and a load equalizer means operatively connected to the chassis and to the frame in the rear portions thereof for tending to maintain the frame in an untorqued condition irrespective of variations in load distribution on the frame comprising a pivoted linkage means adjacent each side of the chassis and frame pivotally connected to the frame at one end thereof, a torque transmitting member extending transversely of and beneath a portion of the chassis and means secured to the chassis supporting said torque transmitting member for pivotal movement, said torque transmitting member being connected at its opposite ends rigidly to said linkage means such that unequal distribution of a load carried by the frame results in pivotal movement of the linkage means on that side of the chassis which carries the greater load for effecting a transfer of a portion of the difference in loading on opposite sides of the frame to the relatively lightly loaded side through said torque transmitting member.

3. In a mobile material handling apparatus having an operator's station and a wheeled chassis, a load supporting frame supported above and extending longitudinally of the chassis, pivot means mounting said frame to the chassis forwardly thereof, actuator means connected to the chassis and frame rearwardly thereof from pivoting said frame upwardly about said pivot means, connector means mounted at each side of the chassis, a transversely extending torque transmitting means supported by the connector means for pivotal movement, rearwardly extending arm means rigidly connected at one end to each of the opposite end portions of the torque transmitting means, link means pivotally connected to the opposite end portion of each arm means and supported from each side of the frame for vertical pivotal movement with the arm means during actuation of the frame above the chassis by said actuator means, said torque transmitting means and one of said arm and link means being effective to transfer a portion of a load on one side of the frame to the opposite side thereof for tending to prevent the load supporting frame from twisting about a longitudinal axis irrespective of unequal distribution of a load carried by the frame.

References Cited

UNITED STATES PATENTS 3,031,091    4/1962    Erickson et al.
3,131,913    5/1964    Swarthout _____ 298—22 X

FOREIGN PATENTS 689,886    6/1964    Canada.
1,378,446    10/1964    France.
721,216    1/1955    Great Britain.

BENJAMIN HERSH, *Primary Examiner.*

J. A. PEKAR, *Assistant Examiner.*